United States Patent Office.

JAMES CARTWRIGHT, OF YOUNGSTOWN, OHIO.

Letters Patent No. 73,163, dated January 7, 1868.

IMPROVED PROCESS OF MIXING IRON AND STEEL.

The Schedule referred to in these Letters Patent and making part of the same.

TO ALL WHOM IT MAY CONCERN:

Be it known that I, JAMES CARTWRIGHT, of Youngstown, in the county of Mahoning, and State of Ohio, have invented a new and improved Process of Mixing Steel and Iron; and I do hereby declare that the following is a full, clear, and exact description thereof, which will enable those skilled in the art to make and use the same, reference being had to the accompanying drawings, forming part of this specification.

This invention relates to a new and improved method or process for combining steel and iron, whereby a greatly-improved article is produced, as regards its tenacity, flexibility, and strength. Combining as it does the strength of steel and the tenacity and softness of iron, the mixed article is admirably adapted to various purposes in the construction of machinery and for other articles and operations in the mechanic arts.

In carrying out my invention and discovery, I proceed as follows: After preparing the bottom of a puddling-furnace with sand, (or iron "fixing,") I throw in and cover the bottom of the furnace with cast or wrought-iron turnings (or with both combined) to the depth of an inch or more, spreading the same evenly over the bottom. I then prepare an equal proportion of wrought iron and steel scrap by cutting the same into small or moderate-sized pieces, and mixing the pieces thoroughly together, and throw the mixture into the furnace and spread it evenly over the layer of iron turnings already there. I then cover this scrap with another layer of turnings, of about the same thickness as the first, and when the turnings have been heated to a welding or molten state I roll the whole mass into a ball or balls in the furnace, keeping the scrap encased or surrounded with the turnings, thus protecting it from the air in the furnace until it is heated to a white or welding-heat. I then take the balls from the furnace and roll them to the desired shape, thus producing a most superior article as regards ductility, strength, and tenacity.

Having thus described my invention, I claim as new, and desire to secure by Letters Patent—

The process of mixing and combining steel and iron, substantially as herein described.

JAMES CARTWRIGHT.

Witnesses:
SINGLETON KING,
SAML. K. SHEDD.